United States Patent
John et al.

(10) Patent No.: US 10,659,383 B2
(45) Date of Patent: *May 19, 2020

(54) SYSTEM AND METHOD FOR LATENCY-BASED QUEUING

(71) Applicant: Visa International Service Association, San Francisco, CA (US)

(72) Inventors: Rhidian John, County Down (GB); Thomas Looney, Belfast (GB); Bartlomiej Prokop, Belfast (GB)

(73) Assignee: Visa International Service Association, San Francisco, CA (US)

( * ) Notice: Subject to any disclaimer, the term of this patent is extended or adjusted under 35 U.S.C. 154(b) by 122 days.

This patent is subject to a terminal disclaimer.

(21) Appl. No.: 15/916,058

(22) Filed: Mar. 8, 2018

(65) Prior Publication Data

US 2018/0198725 A1  Jul. 12, 2018

Related U.S. Application Data

(63) Continuation of application No. 15/144,216, filed on May 2, 2016, now Pat. No. 9,935,888.

(51) Int. Cl.
*H04L 12/875* (2013.01)
*H04L 12/26* (2006.01)
(Continued)

(52) U.S. Cl.
CPC .......... *H04L 47/56* (2013.01); *H04L 43/0852* (2013.01); *H04L 43/0864* (2013.01);
(Continued)

(58) Field of Classification Search
CPC . H04L 47/56; H04L 43/0852; H04L 43/0864; H04L 51/28; H04L 67/02
See application file for complete search history.

(56) References Cited

U.S. PATENT DOCUMENTS

| 5,767,785 A | 6/1998 | Goldberg |
| 5,882,835 A | 3/1999 | Park et al. |

(Continued)

FOREIGN PATENT DOCUMENTS

| CN | 1742465 | 3/2006 |
| WO | 2007/073628 A1 | 7/2007 |
| WO | 2015/172815 A1 | 11/2015 |

OTHER PUBLICATIONS

Extended European Search Report dated Mar. 7, 2019 for European Patent Application No. EP17793045.0, 9 pages.
(Continued)

*Primary Examiner* — Alina A Boutah
(74) *Attorney, Agent, or Firm* — Kilpatrick Townsend & Stockton, LLP (57) ABSTRACT

Embodiments of the present invention are directed to systems and methods for queuing and sending messages to recipients according to historical latency values associated with each recipient. In some embodiments, a plurality of messages are received, each message including a network address of a recipient. The messages are sent to the recipients by threads that remain active (i.e., cannot be used to send another message) until confirmation responses are received from the recipients. Latency times are measured between when the messages were sent and when the confirmation responses were received. The latency times may be used to assign future messages to queues designated by certain latency ranges.

16 Claims, 7 Drawing Sheets

(51) Int. Cl.
*H04L 12/58* (2006.01)
*H04L 29/08* (2006.01)

(52) U.S. Cl.
CPC .............. *H04L 43/16* (2013.01); *H04L 51/26* (2013.01); *H04L 51/28* (2013.01); *H04L 67/00* (2013.01); *H04L 67/02* (2013.01)

(56) References Cited

U.S. PATENT DOCUMENTS

| | | | |
|---|---|---|---|
| 6,738,386 | B1 | 5/2004 | Holmqvist et al. |
| 7,626,988 | B2 | 12/2009 | Dennison et al. |
| 7,797,284 | B1 * | 9/2010 | Chellappa ............ G06F 11/1464 707/668 |
| 8,547,846 | B1 * | 10/2013 | Ma ........................ H04L 47/12 370/235 |
| 8,547,847 | B2 | 10/2013 | Brown et al. |
| 2003/0084029 | A1 | 5/2003 | Fanning |
| 2004/0177118 | A1 | 9/2004 | Mason et al. |
| 2007/0124398 | A1 * | 5/2007 | Parkinson ............. G06Q 10/10 709/206 |
| 2008/0267203 | A1 | 10/2008 | Curcio et al. |
| 2009/0132661 | A1 * | 5/2009 | Kao ..................... G06Q 10/107 709/206 |
| 2010/0005512 | A1 * | 1/2010 | Wahl ...................... H04L 63/08 726/4 |
| 2010/0309783 | A1 * | 12/2010 | Howe ................ H04L 43/0852 370/230 |
| 2010/0309928 | A1 * | 12/2010 | Saha ................. H04L 12/1895 370/412 |
| 2013/0080543 | A1 | 3/2013 | Jang |
| 2013/0100816 | A1 * | 4/2013 | Bergamasco ....... H04L 43/0864 370/237 |
| 2014/0146682 | A1 * | 5/2014 | Kakadia .................. H04L 47/28 370/238 |
| 2015/0026006 | A1 | 1/2015 | Jackson et al. |
| 2015/0350097 | A1 * | 12/2015 | Osuga ................ H04L 43/0852 370/230 |
| 2016/0028744 | A1 | 1/2016 | Tomkow |
| 2016/0044126 | A1 * | 2/2016 | Mahadevan ........ H04L 67/2842 709/213 |
| 2017/0063705 | A1 * | 3/2017 | Gilson ................. H04L 47/286 |
| 2017/0103457 | A1 * | 4/2017 | Acuna-Rohter ....... G06Q 40/04 |

OTHER PUBLICATIONS

Office Action cited in Chinese Patent Application No. 201780027201.2 dated Jul. 17, 2109, 16 pages.
PCT/US2017/030241 , "International Search Report and Written Opinion", dated Jul. 27, 2017, 9 pages.

* cited by examiner

SYSTEM AND METHOD FOR LATENCY-BASED QUEUING

CROSS-REFERENCES TO RELATED APPLICATIONS

The present application is a continuation of U.S. application Ser. No. 15/144,216, filed May 2, 2016, which is hereby incorporated by reference in its entirety for all purposes.

BACKGROUND

Conventional messaging techniques place all messages to be delivered in a single queue. Each message is allocated to a thread to be sent, generally in the order that they are generated or received. In communication protocols that require a confirmation response from the recipient, the thread remains active and cannot be used to send the next message in the queue until the confirmation response is received from the message recipient. Thus, when a message recipient takes a long time to send a confirmation response, the remaining messages in the queue are delayed in being sent.

Some techniques can use multiple queues, but current methods still do not address certain problems that can arise when sending messages to many, various recipient computers.

SUMMARY

Thus, there is a need for new and enhanced systems and methods of queuing and sending messages that reduces the delay caused by slow-responding message recipients. Embodiments of the invention can address these and other problems, individually and collectively.

Embodiments of the invention are directed to systems and methods related to real-time latency-based queuing of messages that can reduce delay in delivering the messages.

One embodiment of the invention is directed to a method comprising receiving, at a server computer system, a plurality of messages, each message including a network address of a recipient computer. The method further comprises sending, by the server computer system over a network, the messages to the recipient computers, each of the plurality of messages being sent by a thread of a plurality of threads executing on the server computer system, wherein the thread is required to wait for a confirmation response from the corresponding recipient computer before sending another message of the plurality of messages. The method further comprises determining a latency time for the confirmation response to be received by the server computer system for each of the plurality of messages. The method further comprises receiving, at the server computer system, a first message including a first network address of a first recipient computer, and determining whether other messages have previously been sent to the first network address of the first recipient computer. The method further comprises, after determining that other messages have previously been sent to the first network address: determining a latency value for response to the other messages associated with the first network address, placing the first message in a first latency queue based on the latency value for response being below a first threshold, and placing the first message in a second latency queue based on the latency value for response being above the first threshold. Different threads of the plurality of threads are allocated to the first latency queue and the second latency queue.

Another embodiment of the invention is directed to a server computer system comprising a processor and memory coupled to the processor. The memory stores instructions, which when executed by the processor, cause the server computer system to perform operations including the steps of the above method.

These and other embodiments of the invention are described in further detail below.

TERMS

Prior to discussing specific embodiments of the invention, some terms may be described in detail.

A "confirmation response" may include any message sent by a recipient to a sender confirming receipt of a message from the sender. The confirmation response may include any combination of letters, numbers, and/or symbols representing or communicating receipt of the message. The confirmation response may include an identifier of the recipient, an identifier of the original message, and/or the original message itself so that the confirmation response may be matched to the original message. The confirmation response may be automatically generated by the recipient.

A "hash" may include any combination of letters, numbers and/or symbols representing a string of text. A hash is typically shorter in length than the underlying string of text, and is generated in such a way that it is unlikely that a different string of text will produce the same hash. A hash may be used to efficiently store and access data records, and to provide security for data records.

A "latency time" may include any delay or lapse in time between input and a desired outcome. For example, a latency time for response may correspond to the elapsed time between when a message is sent by a sender to a recipient, and when a confirmation response is received by the sender from the recipient. A "latency value" may be a property of a plurality of messages, such as a mean, median or mode value of a plurality of latency times. A "threshold latency value" may correspond to any particular latency value, and may be selected as described further herein.

A "message" may include any communication from one party or entity to another party or entity. The communication may include, for example, information or data in any suitable form. Further, the message may be transmitted by any suitable method such as, for example, over a network.

A "network address" may include any combination of letters, numbers and/or symbols identifying a device on a network. Exemplary network addresses include Internet Protocol (IP) addresses, media access control (MAC) addresses, host addresses, Uniform Resource Identifier (URI) addresses, and the like. A network address may be unique to an individual device or may be unique to a component within an individual device. For example, a computer's WiFi may have a different network address than its local area network (LAN) card. In one embodiment, a network address may include an e-mail address.

A "queue" may include a collection of ordered messages defined by some parameter. For example, a queue may be defined by a range of latency values. A queue may pass messages to be sent to one or more threads assigned to that queue.

A "server computer system" may include a computer or cluster of computers. For example, the server computer system can be a large mainframe, a minicomputer cluster, or a group of servers functioning as a unit. In one example, the server computer system may be a database server coupled to a Web server. The server computer system may be coupled to a database and may include any hardware, software, other logic, or combination of the preceding for servicing the requests from one or more client computers. The server computer system may comprise one or more computational apparatuses and may use any of a variety of computing structures, arrangements, and compilations for servicing the requests from one or more client computers.

A "thread" may include any process (or instance of a process) executing on a computer. A thread may be configured to send messages via a communications channel, e.g., a network socket. The thread may further be configured to receive confirmation responses of receipt of messages.

DETAILED DESCRIPTION

Embodiments of the present invention are directed to systems and methods for queuing and sending messages to recipients according to historical latency values associated with each recipient. In some embodiments, a plurality of messages are received, each message including a network address of a recipient. The messages are sent to the recipients by threads that remain active (i.e., cannot be used to send another message) until confirmation responses are received from the recipients. Latency times are measured between when the messages were sent and when the confirmation responses were received. The latency times may be used to assign future messages to queues designated by certain latency ranges.

Embodiments can be used to reduce delay in sending messages caused by slow-responding recipients. Thus, threads may be cleared quickly and used to send further messages, reducing the overall number of threads needed to send messages and reducing costs associated with adding new threads. Further, more messages can be delivered in a shorter amount of time. This is important in high-volume messaging systems that may handle 700,000 or more messages per day.

I. Messaging

Messaging is the process of delivering any type of data from a sender to a recipient. The data may contain any information that needs to be communicated to the recipient. Messaging may occur over a network, for example, to transmit data to a remote party. In messaging systems, individual messages are placed in a single queue based on their time of generation or receipt, and sent in order.

Figure 1:
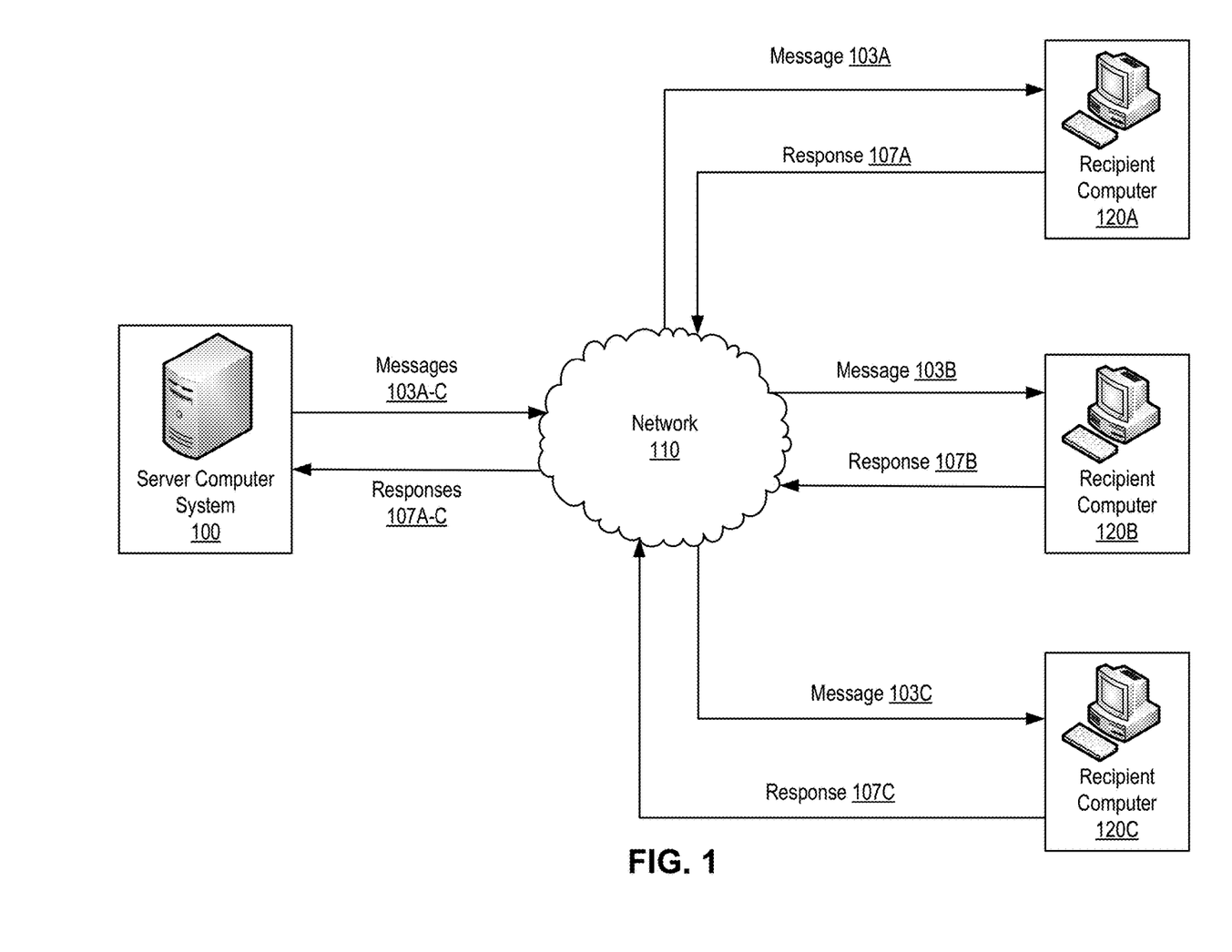
FIG. 1 shows a block diagram showing a system for sending messages and receiving confirmation responses over a network according to an embodiment of the present invention.

FIG. 1 illustrates a block diagram of a messaging system according to an embodiment of the present invention. FIG. 1 illustrates a server computer system 100 communicating with recipient computers 120A-C over a network 110. Network 110 may be any type of network, including a private or public network. A private network may include networks for a large site, such as a corporate office, a university campus, a hospital, a government office, or a similar entity. A network such as illustrated by the example network 110 may also be found at small sites, such as in a private home. A public network may include the Internet. Network 110 may include third-party telecommunication lines, such as phone lines, broadcast coaxial cable, fiber optic cables, satellite communications, cellular communications, and the like.

Server computer system 100 sends a message 103A to recipient computer 120A over network 110, and receives a confirmation response 107A from recipient computer 120A over network 110 after a certain latency time. Similarly, server computer system 100 sends a message 103B to recipient computer 120B over network 110, and receives a confirmation response 107B from recipient computer 120B over network 110 after a certain latency time. Server computer system 100 also sends a message 103C to recipient computer 120C over network 110, and receives a confirmation response 107C from recipient computer 120C over network 110 after a certain latency time.

The messages 103A-C may be any type of messages sent over a network 110 that require confirmation responses 107A-C. For example, messages 103A-C may use Hypertext Transfer Protocol (HTTP), Transmission Control Protocol (TCP), and the like. Although shown and described in FIG. 1 as having three messages 103A-C, it is contemplated that any number of messages may be sent over network 110 over any period of time according to embodiments of the invention. For example, hundreds of thousands or even millions of messages may be sent over network 110 over a 24-hour period.

In conventional systems, messages 103A-C may be placed in a single queue, and allocated to one or more threads to be sent in the order that they are generated or received. The thread remains active and cannot be used to send a next message in the queue until a confirmation response is received from the message recipient.

For example, a conventional system may have one queue and one thread to which messages 103A-C are allocated in order. The first message 103A may be sent to a first recipient computer 120A using the thread. If the first confirmation response 107A isn't received by the server computer system 100 until 60 seconds later, the second message 103B cannot be allocated to the thread and sent until 60 seconds later (i.e., after the first confirmation response 107A is received), delaying transmission of the second message 103б. Further, if the second confirmation response 107б isn't received by the server computer system 100 until 30 seconds after the message is sent to the second recipient computer 120B, the third message 103C cannot be allocated to the thread and sent until 30 seconds later (i.e., after the second confirmation response 107B is received), delaying transmission of the third message 103C.

Thus, in this example, transmission of the third message 103C to the recipient computer 120C has been delayed by 90 seconds. This is particularly inconvenient if the third message 103C is a high priority message or if recipient computer 120C has a historically low latency time (e.g., 100 milliseconds), as the third message 103C could have been sent before and/or been prioritized higher than the first message 103A and the second message 103B. Thus, it is preferable to send messages 103A-C in such a way that rewards fast-responding recipients and does not result in unnecessary delay.

II. Latency-Based Queuing

Embodiments of the present invention assign messages to be sent to queues based on the historical latency times of their recipients, for example, to reduce delays in sending messages.

A. Determining Latency Times

Figure 2:
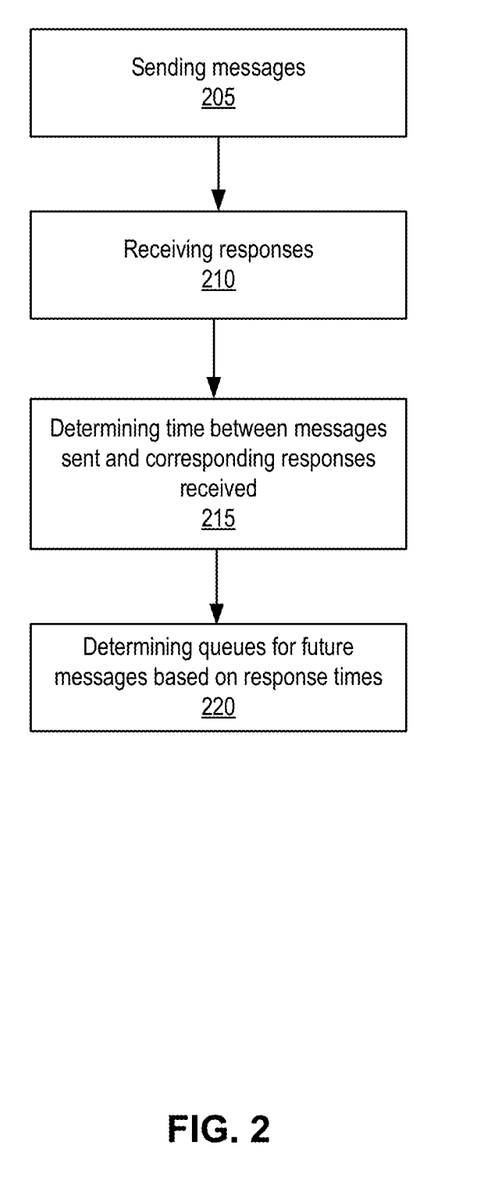
FIG. 2 shows a flow diagram depicting a method for determining latency values according to an embodiment of the present invention.

FIG. 2 shows a flow diagram depicting a method for determining latency times according to an embodiment of the invention. The method may be performed by a server computer system that generates messages or receives messages from one or more other sources. As an example, the server computer system can generate messages using information received from a plurality of other servers, e.g., HTTP servers.

At step 205, a plurality of messages are sent to recipients. The messages may be sent by a server computer system, for example. The messages may be any type of messages sent over a network that require confirmation responses or in which confirmation responses are desired, such as HTTP messages, TCP messages, and the like. The recipients may be any component or device having a network address.

At step 210, confirmation responses acknowledging receipt of the messages are received from the recipients. The confirmation response may include an identifier of the recipient (e.g., a network address), an identifier of the original message (e.g., a value or code), and/or the original message itself so that the confirmation response may be matched to the original message.

At step 215, the amount of time between the messages being sent and the corresponding confirmation responses being received is determined. This amount of time corresponds to a latency time for response. For example, a timestamp created when a particular message was sent can be compared to a timestamp of when the corresponding confirmation response was received to determine the latency time for response to that message.

At step 220, queues for future messages for a particular recipient can be determined based on the historical latency times for response. For example, all or some of the historical latency times for response for that recipient can be used to determine a mean, median or mode latency value. In another example, the latency value may correspond to a percentile, such as the latency value below which 70% of confirmation responses are received. In still another example, a single historical latency time may be selected, such as the most recent latency time, the highest latency time, the lowest latency time, or the only latency time when only one historical latency time is available.

This latency value may be used to allocate any future messages received from that recipient to a queue designated by a particular range of latency values. For example, if the recipient has a 300 millisecond mean latency value, a future message to be sent to that recipient may be allocated to a queue dedicated to recipients having latency values between 200 and 400 milliseconds. There may also be a default queue to which messages for recipients having unknown latency values or no historical latency times are allocated. These concepts are described further herein with reference to FIG. 3.

B. Queue Allocation

A pool of messages to be sent may be allocated to a plurality of queues based on their historical latency times to reduce delay in sending the messages. Messages for a same recipient computer can be allocated to a same queue, which also includes messages for other recipient computers that have similar latency values for responding to the messages. In this manner, recipient computers that respond quickly are not negatively impacted by waiting for responses from slower recipient computers.

Figure 3:
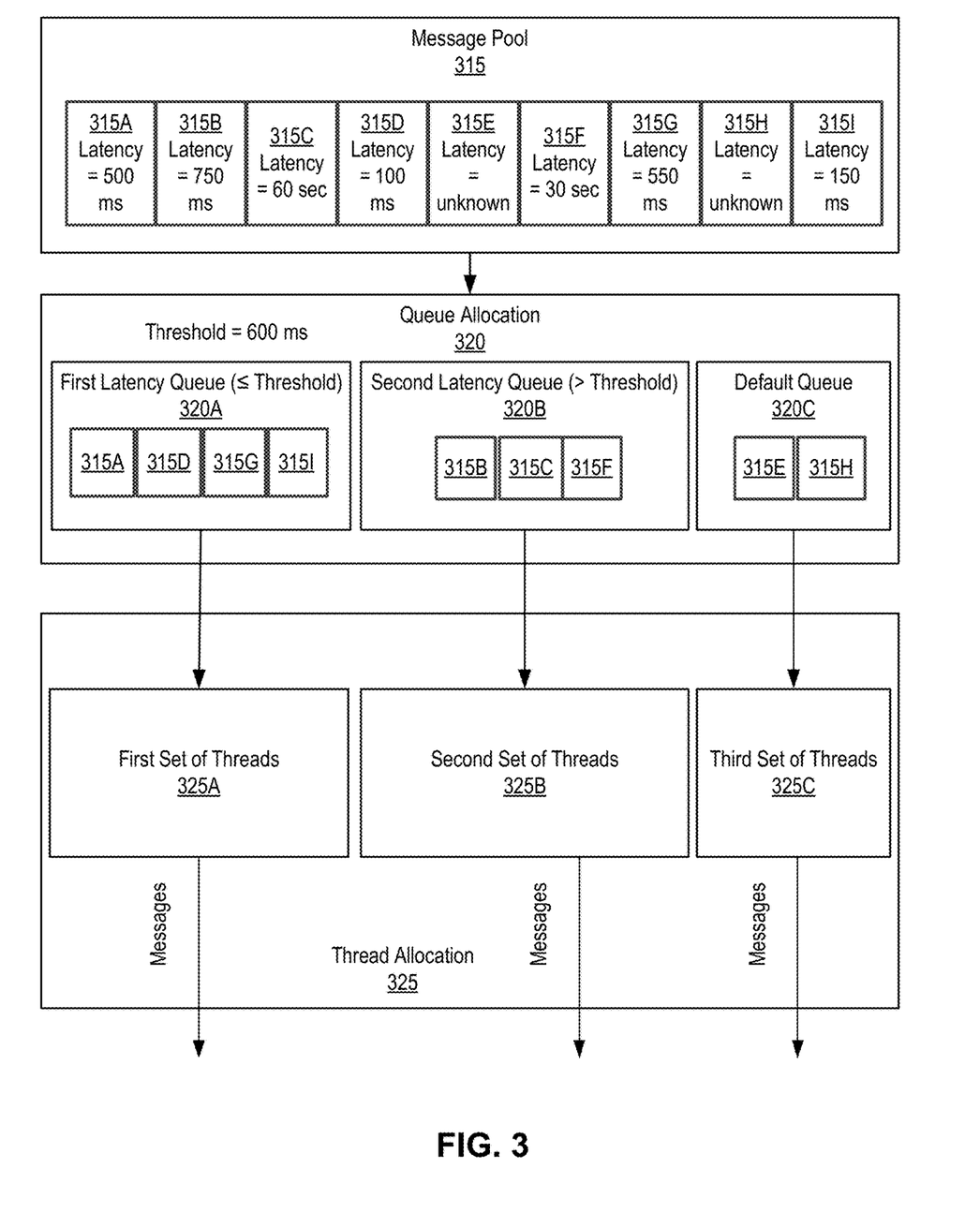
FIG. 3 shows a flow diagram depicting a method for allocating messages to queues based on their historical latency values according to an embodiment of the present invention.

FIG. 3 shows a block diagram depicting an allocation of messages to queues based on their historical latency times. At block 315, a pool of messages 315A-I is received. Messages 315A-I are initially ordered in the pool according to their time of receipt, for example.

Messages 315A-I have a variety of latency values associated with their recipients. For example, message 315A has a latency value of 500 milliseconds; message 315B has a latency value of 750 milliseconds; message 315C has a latency value of 60 seconds; message 315D has a latency value of 100 milliseconds; message 315F has a latency value of 30 seconds; message 315G has a latency value of 550 milliseconds; and message 315I has a latency value of 150 milliseconds. Messages 315E and 315H have unknown latency values. The latency values may be unknown because the recipients associated with messages 315E and 315H have not been previously sent messages, for example. In another example, the latency values may be unknown due to errors or mismatches between previous messages and confirmation responses. Thus, no historical latency times have been recorded for these messages.

At block 320, messages 315A-I are allocated to queues. Three queues are shown in FIG. 3: a first latency queue 320A, a second latency queue 320B, and a default queue 320C. Messages are allocated to first latency queue 320A based on their latency values being less than or equal to a threshold latency value. In this example, the threshold latency value is 600 milliseconds. Thus, messages 315A, 315D, 315G, and 315I are allocated to the first latency queue 320A.

Messages are allocated to second latency queue 320B based on their latency values being greater than the threshold latency value. Thus, messages 3156, 315C, and 315F are allocated to the second latency queue 320B.

Messages are allocated to the default queue 320C based on their latency values being unknown. Thus, messages 315E and 315H are allocated to the default queue 320C. In one embodiment, messages may be allocated to the default queue 320C until they have a certain number of measured historical latency times. For example, messages may be allocated to the default queue if their latency value is based on five or less measured historical latency times.

In some embodiments, other factors may be considered when allocating messages to queues. For example, a high priority message having a latency value greater than the threshold, or a high priority message having an unknown latency value, may nevertheless be allocated to the first latency queue 320A to ensure that it is sent as quickly as possible. Similarly, a low priority message having a latency value below the threshold, or a low priority message having an unknown latency value, may nevertheless be allocated to the second latency queue 320B since its receipt may not be as critical. In another example, a service level agreement with a certain sender may specify that its messages go into a particular latency queue, regardless of the latency value. In still another example, certain senders may be organized into tiers based on any of a number of factors, with messages from each tier being assigned to a particular queue regardless of the latency value.

Although shown and described as having three queues (i.e., first latency queue 320A, second latency queue 320B, and default queue 320C), it is contemplated that any number of queues may be established based on any range of latency values. For example, a first latency queue may correspond to latency values less than or equal to 400 milliseconds; a second latency queue may correspond to latency values between 400 and 600 milliseconds; and a third latency queue may correspond to latency values greater than or equal to 600 milliseconds and unknown latency values.

The historical latency times for messages to recipients that have previously received a plurality of messages (i.e., that have a plurality of historical latency time measurements) may be combined in any manner to produce a latency value. For example, a mean, median or mode may be calculated of the plurality of historical latency time measurements to establish a single latency value to be used for a recipient.

The threshold latency value (in this example, 600 milliseconds) may be any latency time, and may be established according to any method. For example, the threshold latency value may be arbitrarily and/or randomly chosen. In another example, the threshold latency value may be selected based on the mean, median or mode latency value for response for a plurality of messages to a plurality of recipients. Further, the threshold latency value may be dynamically changed after it is selected based on a current volume of messages in each queue. For example, the threshold latency value may be changed based on a first number of messages in the first latency queue 320A and based on a second number of messages in the second latency queue 320B. Thus, the load across all of the queues may be effectively balanced by adjusting the threshold latency value. In one embodiment, the threshold latency value is selected and updated automatically.

At block 325, messages 315A-I are allocated to threads to be sent. Messages 315A, 315D, 315G, and 315I (i.e., messages within the first latency queue 320A) are allocated to a first set of threads 325A. Messages 3156, 315C, and 315F (i.e., messages within the second latency queue 320B) are allocated to a second set of threads 325B. Messages 315E and 315H (i.e., messages within the default queue 320C) are allocated to a third set of threads 325C. Any number of threads may be included in the first set of threads 325A, the second set of threads 325B, and the third set of threads 325C, and that number may be changed at any time or continuously, as described further herein. Further, new threads may be added to increase the overall number of threads at any time.

One message may be sent by one thread at a time, with the thread remaining active until a corresponding confirmation response is received. For example, a thread within the first set of threads 325A may send message 315A. Only after receiving a corresponding confirmation response to message 315A may the thread send another message in the first latency queue 320A (e.g., message 315D, 315G, or 315I).

The messages may be allocated to the threads in any order, such as in the order that they are received, according to their latency times, according to their priority, or any combination thereof. For example, message 315D may be allocated to a thread within the first set of threads 325A first, because it has the shortest latency value of 100 milliseconds. In another example, if message 315G is a high priority message, it may be allocated to a thread within the first set of threads 325A first, with the remaining messages 315D, 315G, and 315I being sent in order.

Once the messages 315A-I are allocated to threads, they are sent by the threads and confirmation responses are received. The latency time for response to each message is measured and recorded.

C. Sequence Diagrams

Figure 4:
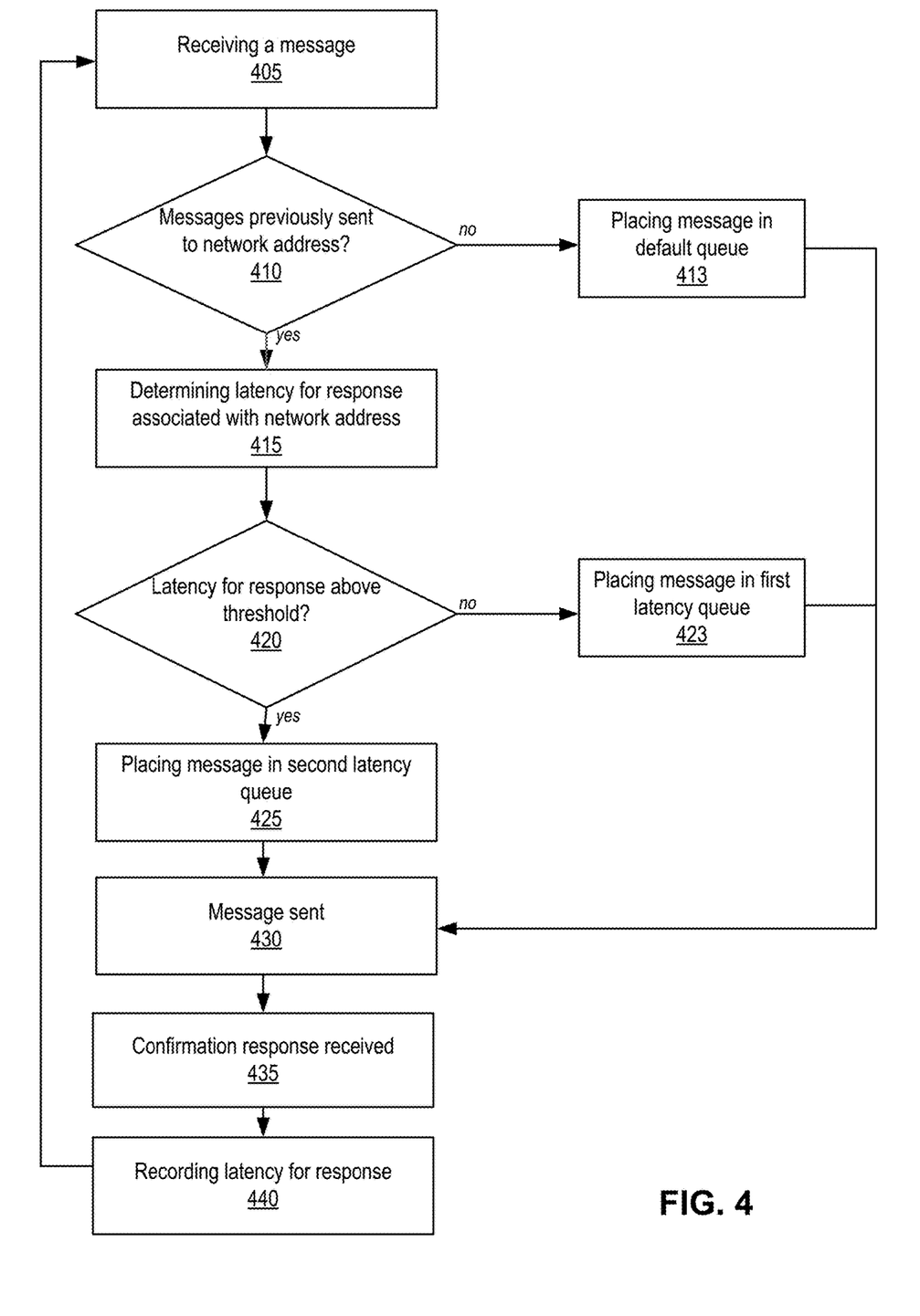
FIG. 4 shows a flow diagram depicting a method for queuing messages, sending messages, and measuring latency values for response, according to an embodiment of the present invention.

Various methods may be used to implement the embodiments of the invention described above. FIG. 4 shows a flow diagram depicting a method for queuing messages, sending messages, and measuring latency times for response according to an embodiment of the invention. The steps of FIG. 4 may be executed, for example, by server computer system 600 of FIG. 6, described further herein.

At step 405, a message is generated or received. The message may include any data to be transmitted to a recipient over a network, for example. The message may include a network address associated with and identifying the recipient. A recipient may have one or a plurality of network addresses associated with it. In one embodiment, a hash of the network address associated with the recipient is generated. The hash may be any combination of letters, numbers and/or symbols representing the network address or any portion of the network address (e.g., a domain name).

At step 410, it is determined whether messages were previously sent to the network address associated with the recipient. For example, the network address may be compared with stored network addresses associated with previously sent messages in a database. In another example in which a hash of the network address was generated, the hash may be compared to stored hashes of network addresses associated with previously sent messages in a database. Because a given recipient may be associated with a plurality of network addresses, each having the same or different latency values, network addresses are used for comparison, instead of a recipient identifier or name in this embodiment. In another embodiment, however, a recipient identifier or name could alternatively or additionally be used for comparison.

If messages were not previously sent to the network address, the message is placed in a default queue at step 413. The default queue may be default queue 320C of FIG. 3, for example. The method continues at step 430, as described further herein.

If messages were previously sent to the network address, a latency value for response associated with the network address is determined at step 415. For example, a record of one or more historical latency times for response may be stored in association with the network address in a database. A mean, median or mode of a plurality of historical latency times associated with the network address may be calculated to determine a single latency value for response associated with the network address. The mean, median or mode may be calculated based on all of the plurality of historical latency times, or based on any subset of the plurality of historical latency times. For example, the mean, median or mode may be calculated of the last n historical latency times (i.e., the n most recent historical latency times). In another example, only the most recent historical latency time can be used as the latency value for response. In still another example, the fastest or slowest historical latency time can be used as the latency value for response. However, it is contemplated that any or all of the historical latency times can be used to determine the latency value for response associated with a network address.

At step 420, it is determined whether the latency value for response associated with the network address is above a threshold. If the latency value for response is not above the threshold, the message is placed in a first latency queue at step 423. The first latency queue may be first latency queue 320A of FIG. 3, for example. The method then continues at step 430, as described further herein.

If the latency value for response is above the threshold, the message is placed in a second latency queue at step 425. The second latency queue may be second latency queue 320B of FIG. 3, for example. The method then continues at step 430.

At step 430, after the message is placed in either the default queue at step 413, the first latency queue at step 423, or the second latency queue at step 425, the message is sent to the network address. At some point later, a confirmation response is received from the network address at step 435. The confirmation response may include an identifier of the recipient, an identifier of the original message, and/or the original message itself so that the confirmation response may be matched to the original message.

At step 440, the latency time for response is determined and recorded in a database in association with the network address. For example, the elapsed time is calculated between when the message was sent and when the corresponding confirmation response was received using their timestamps. This latency time for response may then be used to allocate future messages to that network address to a particular queue, as described further herein. The method then returns to step 405 to receive and process another message.

Figure 5:
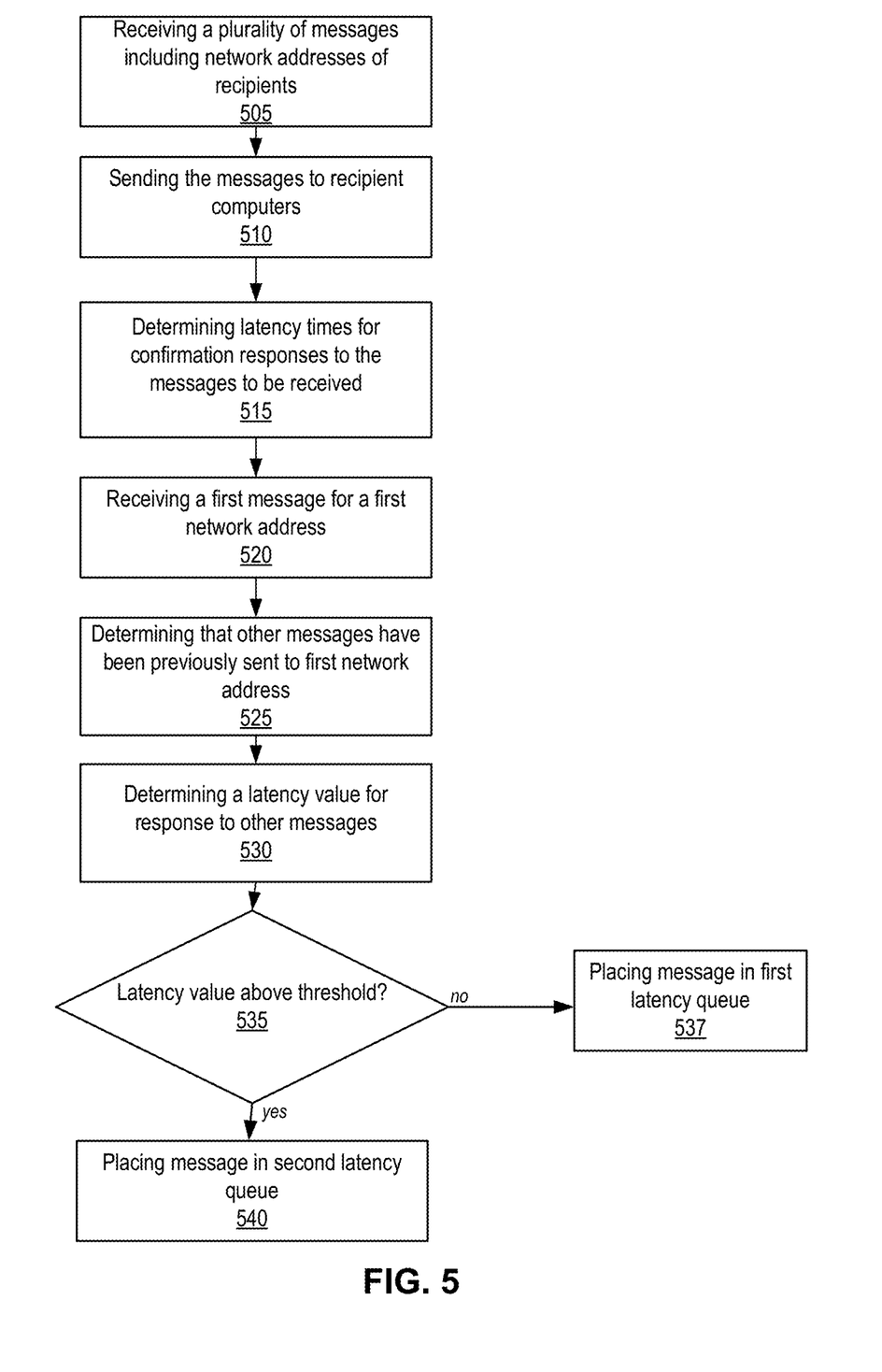
FIG. 5 shows a flow diagram depicting a method for latency-based queuing according to an embodiment of the present invention.

Latency values for a plurality of messages may be determined and used to allocate a future message to a particular queue, as illustrated in FIG. 5. Aspects of methods depicted in FIG. 2 and FIG. 4 can be used in FIG. 5.

FIG. 5 shows a flow diagram depicting a method for latency-based queuing according to an embodiment of the invention. At step 505, a plurality of messages are received at a server computer system. The server computer system may be, for example, server computer system 600 of FIG. 6, as described further herein. Each message includes a network address of a recipient computer. In one embodiment, a hash of each network address may be generated and stored in a database.

At step 510, the messages are sent over a network to the recipient computers using the network address. Each of the plurality of messages are sent by a thread of a plurality of threads executing on the server computer system. The threads may be, for example, any threads within the first set of threads 325A, the second set of threads 325B, and/or the third set of threads 325C of FIG. 3. Any number of threads may be used to send messages, depending on demand and capacity, but may be in the hundreds or even thousands. The messages may be sent to the recipient computers using at least one of HTTP, TCP, and the like Each thread is required to wait for a confirmation response from the corresponding recipient computer before sending another message of the plurality of messages. Thus, if an error or timeout occurs, the message may be reassigned to the same or a different queue, and/or the thread or a different thread may attempt to send the message again, and wait for a proper confirmation response. A timeout may occur after any predetermined amount of time, such as, for example, 5 minutes after the message is sent. In one embodiment, when the message is reassigned, it may be reassigned to a different queue than was originally assigned. For example, the message may be assigned to a lower priority queue each time an error or timeout occurs. In one embodiment, after a threshold number of delivery attempts (e.g., 5 delivery attempts), the message may either be dropped or put into a separate queue for manual review.

At step 515, a latency time for the confirmation response to be received by the server computer system is determined for each of the plurality of messages. For example, the time between when the message was sent and when the corresponding confirmation response was received may be measured by comparing timestamps, for example, or by starting a timer when the message is sent and stopping it when the corresponding confirmation response is received. The confirmation response may be matched with its corresponding message by an identifier, for example.

At step 520, a first message is received at the server computer system. The first message includes a first network address of a first recipient computer. In one embodiment, a hash of the first network address may be generated.

At step 525, it is determined that other messages have been previously sent to the first network address of the first recipient computer. This determination may be made, for example, by comparing the first network address to network addresses associated with previously sent messages in a database. In another example, this determination may be made by comparing the hash of the first network address to the stored hashes of network addresses associated with previously sent messages in a database. If other messages have not been previously sent to the first network address, the first message may be placed in a default queue, such as default queue 320C of FIG. 3, for example.

After determining that other messages have previously been sent to the first network address, however, a latency value for response to the other messages associated with the first network address is determined at step 530. The latency value may be a statistical parameter of a statistical distribution of historical latency times associated with a plurality of other messages to the first network address. The statistical parameter may be calculated as a mean, a mode, or a median of the statistical distribution, for example.

At step 535, it is determined whether the latency value is above a threshold. If the latency value is not above the threshold, the message is placed in a first latency queue at step 537. The first latency queue may be first latency queue 320A of FIG. 3, for example.

If the latency value is above the threshold, the message is placed in a second latency queue at step 540. The second latency queue may be second latency queue 320B of FIG. 3, for example. After placing the message in the second latency queue, the server computer system may generate an alert to the first recipient computer notifying the first recipient computer that the latency value for response is above the threshold for the first network address. This may allow the first recipient computer to make adjustments to improve future latency times for the first network address.

In one embodiment, the threshold latency value may be selected arbitrarily or randomly. In another embodiment, the threshold may be a median, mean or mode latency value for a plurality of messages and/or for a plurality of recipients at any given time, over a period of time, or over all time. In either embodiment, the threshold latency value may be dynamically changed at any point (i.e., at any time or at a particular interval) or continuously. For example, the threshold latency value may be dynamically changed based on the volume of messages in the first latency queue and the second latency queue at a particular point. In other words, the loads at the first latency queue and the second latency queue may be balanced by adjusting the threshold.

Different threads of the plurality of threads are allocated to the first latency queue and the second latency queue. For example, a first set of threads 325A may be allocated to the first latency queue, and a second set of threads 325B may be allocated to the second latency queue, as shown in FIG. 3. In one embodiment, the number of threads allocated to each queue may be selected arbitrarily or randomly. Alternatively or additionally, the number of threads in each set (i.e., the number of threads allocated to a particular queue) may be dynamically determined or changed at any point (i.e., at any time or at a particular interval) or continuously. In one embodiment, the number of threads allocated to the first latency queue and the second latency queue can be dynamically changed based on the volume of messages in the first latency queue and the second latency queue at a particular point. For example, the number of threads allocated to the first latency queue and the second latency queue can be dynamically changed based on a first number of messages in the first latency queue and based on a second number of messages in the second latency queue. Thus, the loads at the first latency queue and the second latency queue may be balanced by adjusting the number of threads allocated to each queue.

III. Example Systems

Various systems may be used to implement the methods described above. Examples of a server computer system and a recipient computer system are now described.

Figure 6:
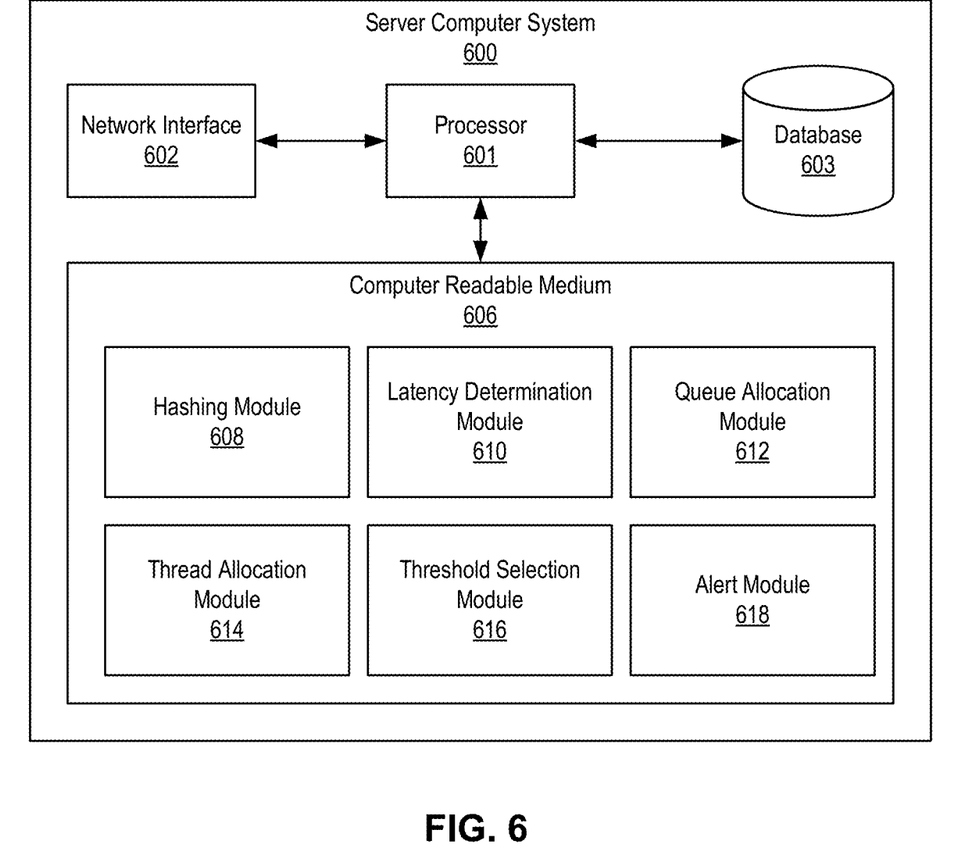
FIG. 6 shows a block diagram of a server computer system for latency-based queuing according to an embodiment of the present invention.

FIG. 6 shows a block diagram of a server computer system 600 for latency-based queuing according to an embodiment of the present invention. Server computer system 600 may implement any of the methods described herein. Server computer system 600 may include a processor 601 coupled to a network interface 602 and a computer readable medium 606. Server computer system 600 may also include or otherwise have access to a database 603 that may be internal or external to server computer system 600. In one embodiment, database 603 is an in-memory database.

Processor 601 may include one or more microprocessors to execute program components for performing the latency-based queuing functions of server computer system 600. Network interface 602 can be configured to connect to one or more communication networks to allow server computer system 600 to communicate with other entities, such as recipient computer 700 of FIG. 7. Computer readable medium 606 may include any combination of one or more volatile and/or non-volatile memories, for example, RAM, DRAM, SRAM, ROM, flash, or any other suitable memory components. Computer readable medium 606 may store code executable by the processor 601 for implementing some or all of the latency-based queuing functions of server computer system 600. For example, computer readable medium 606 may include code implementing a hashing module 608, a latency determination module 610, a queue allocation module 612, a thread allocation module 614, a threshold selection module 616, and an alert module 618. Although shown and described as having each of these modules, it is contemplated that more or fewer modules may be implemented within computer readable medium 606. For example, a hashing module 608, a threshold selection module 616, and/or an alert module 618 may not be implemented in all embodiments.

Hashing module 608 may, in conjunction with processor 601, generate hashes of the network addresses and/or portions of network addresses of recipient computers for messages. The hashes corresponding to the network addresses may be stored in database 603. Hashing module 608 may further, in conjunction with processor 601, compare generated hashes of network addresses to stored hashes of network addresses to determine whether messages have been previously sent to particular network addresses.

Latency determination module 610 may, in conjunction with processor 601, measure latency times between when messages are sent and when their corresponding confirmation responses are received. For example, latency determination module 610 may, in conjunction with processor 601, record a first timestamp when a message is sent and a second timestamp when a corresponding confirmation response is received. Latency determination module 610 may then, in conjunction with processor 601, measure the amount of time elapsed between the first timestamp and the second timestamp to determine a latency time. The latency time may be stored in conjunction with a network address or hash of a network address in database 603.

Latency determination module 610 may further, in conjunction with processor 601, determine a latency value based on a plurality of historical latency times. The latency value may be a mean, median or mode of the plurality of historical latency times, for example. The mean, median or mode may be calculated based on all of the plurality of historical latency times, or based on any subset of the plurality of historical latency times.

Queue allocation module 612 may, in conjunction with processor 601, place a message in a queue based on a latency value. For example, queue allocation module 612 may, in conjunction with processor 601, place a message in a first latency queue if the latency value is below a threshold, place the message in a second latency queue if the latency value is above a threshold, or place the message in a default queue if the latency value is unknown. The latency value used to determine queue allocation may be an overall latency value based on all latency times recorded and associated with a network address, or may be based on a subset of recorded latency times, such as the last n latency times. In another embodiment, the latency value used may be the fastest latency time, the slowest latency time, and/or the most recent latency time.

Thread allocation module 614 may, in conjunction with processor 601, send messages from a queue to a thread dedicated to that queue. Thread allocation module 614 may, in conjunction with processor 601, send a first message of a plurality of messages in a queue, and wait until a corresponding confirmation response is received before sending a second message of the plurality of messages in the queue. Each thread is dedicated to a particular queue. Thread allocation module 614 may further, in conjunction with processor 601, dynamically determine or change the number of threads allocated to each queue based on, for example, the number of messages in each queue at a given time. Thus, thread allocation module 614 may, in conjunction with processor 601, balance load across the queues.

Threshold selection module 616 may, in conjunction with processor 601, set a threshold latency time upon which queues are defined. In one embodiment, the threshold is selected or changed arbitrarily or randomly. In another embodiment, the threshold is selected or changed based on a mean, median or mode latency time of a plurality of network addresses at a given time. In still another embodiment, the threshold is dynamically selected or changed based on, for example, the number of messages in each queue at a given time. Thus, threshold selection module 616 may, in conjunction with processor 601, balance load across the queues.

Alert module 618 may, in conjunction with processor 601, alert a recipient computer that its latency time for response at a particular network address is above a threshold. The alert may be in the form of a subsequent message. This allows the recipient computer to make any desired changes to decrease its latency time, thus potentially allowing the recipient computer to receive messages faster in the future if allocated to a different queue.

Figure 7:
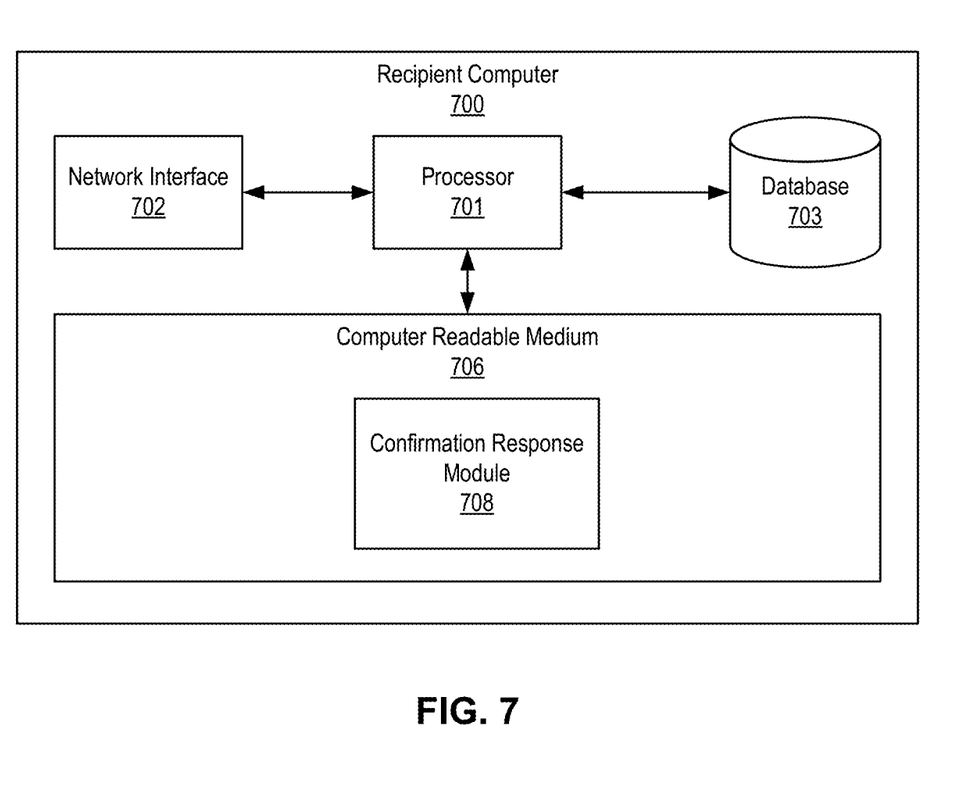
FIG. 7 shows a block diagram of a recipient computer for receiving messages and sending confirmation responses according to an embodiment of the present invention.

FIG. 7 shows a block diagram of a recipient computer 700 for receiving messages and sending confirmation responses according to an embodiment of the present invention. Recipient computer 700 may implement any of the recipients and/or recipient computers described herein. Recipient computer 700 may include a processor 701 coupled to a network interface 702 and a computer readable medium 706. Recipient computer 700 may also include or otherwise have access to a database 703 that may be internal or external to server computer system 600.

Processor 701 may include one or more microprocessors to execute program components for performing the receiving and sending functions of recipient computer 700. Network interface 702 can be configured to connect to one or more communication networks to allow recipient computer 700 to communicate with other entities, such as server computer system 600 of FIG. 6. Computer readable medium 706 may include any combination of one or more volatile and/or non-volatile memories, for example, RAM, DRAM, SRAM, ROM, flash, or any other suitable memory components. Computer readable medium 706 may store code executable by the processor 701 for implementing some or all of the receiving and sending functions of recipient computer 700. For example, computer readable medium 706 may include code implementing a confirmation response module 708.

Confirmation response module 708 may, in conjunction with processor 701, receive messages and generate confirmation responses that the messages were received. The confirmation response may include any combination of letters, numbers, and/or symbols representing or communicating receipt of the message. The confirmation response may include an identifier of the recipient, an identifier of the original message, and/or the original message itself so that the confirmation response may be matched to the original message by the sender.

IV. Examples

A. Transaction Processing

Embodiments of the present invention may be used in messaging for transaction processing. Specifically, messages may be queued and sent between access devices, merchant computers, acquirer computers, payment processing networks, and/or issuers. Exemplary messages may be sent from payment processing networks (e.g., server computer systems) to merchant computers (e.g., recipient computers), and may include a confirmation that a transaction has occurred, a confirmation that a payment went through, a confirmation that a fraud check has been completed, customer loyalty information, and the like.

B. Additional Embodiments

Embodiments of the present invention may additionally or alternatively be used to deliver any messages to any third parties over a network. In one embodiment, Short Message Service (SMS) messages may be managed by the latency-based queuing systems and methods described herein, with the network address of the recipient corresponding to a mobile phone number. In another embodiment, webhooks for web applications may be managed by the latency-based queuing systems and methods described herein (e.g., push notifications to a user of a website).

V. Example Computer Systems

The various participants and elements described herein may operate one or more computer apparatuses to facilitate the functions described herein. Any of the elements in the above-described figures, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art. For example, an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server computer system comprising:
   a processor; and
   a memory coupled to the processor, the memory storing instructions, which when executed by the processor, cause the server computer system to perform operations including:
   receiving a plurality of messages including network addresses of recipient computers, each message including a network address of a recipient computer;
   sending, over a network, the messages to the recipient computers;
   determining a latency time for a confirmation response to be received by the server computer system for each of the plurality of messages;
   receiving a first message including a first network address of a first recipient computer;
   determining whether other messages have previously been sent to the first network address of the first recipient computer;
   after determining that other messages have previously been sent to the first network address:
   determining a latency value for response to the other messages associated with the first network address;
   comparing the latency value to a first threshold; and
   determining whether to place the first message in a first latency queue or in a second latency queue based on the comparing of the latency value to the first threshold, wherein the first latency queue corresponds to one or more network addresses having lower latency values for responses than one or more network addresses corresponding to the second latency queue.

2. The server computer system of claim 1, wherein the operations further include:
   generating hashes of at least a portion of the network addresses of the recipient computers for the plurality of messages;
   storing the hashes in a database; and
   generating a first hash of at least a portion of the first network address,
   wherein determining that other messages have previously been sent to the first network address comprises comparing the first hash to the stored hashes in the database.

3. The server computer system of claim 1, wherein the operations further include:
   after determining that other messages have not previously been sent to the first network address, placing the first message in a default queue.

4. The server computer system of claim 1, wherein the latency times of the other messages associated with the first network address form a statistical distribution, and wherein determining the latency value for response to the other messages associated with the first network address comprises:
   calculating a statistical parameter of the statistical distribution, wherein the statistical parameter is one of a mean, a mode, or a median of the statistical distribution, the latency value being the statistical parameter.

5. The server computer system of claim 1, wherein the operations further include:
   after placing the first message in the second latency queue, generating an alert to the first recipient computer that the latency value for response is above the first threshold for the first network address.

6. The server computer system of claim 1, wherein the operations further include:
   dynamically changing the first threshold based on a first number of messages in the first latency queue and based on a second number of messages in the second latency queue.

7. The server computer system of claim 1, wherein the messages are sent to the recipient computers using at least one of HTTP or TCP.

8. The server computer system of claim 1, wherein the operations further include:
   comparing the latency value to a second threshold; and
   determining whether to place the first message in the second latency queue or a third latency queue based on the comparing of the latency value to the second threshold.

9. A method comprising:
   receiving, at a server computer system, a plurality of messages including network addresses of recipient computers, each message including a network address of a recipient computer;
   sending, by the server computer system over a network, the messages to the recipient computers;
   determining a latency time for a confirmation response to be received by the server computer system for each of the plurality of messages;
   receiving, at the server computer system, a first message including a first network address of a first recipient computer;
   determining whether other messages have previously been sent to the first network address of the first recipient computer;
   after determining that other messages have previously been sent to the first network address:
   determining a latency value for response to the other messages associated with the first network address;
   comparing the latency value to a first threshold; and determining whether to place the first message in a first latency queue or in a second latency queue based on the comparing of the latency value to the first threshold, wherein the first latency queue corresponds to one or more network addresses having lower latency values for responses than one or more network addresses corresponding to the second latency queue.

10. The method of claim 9, further comprising:

generating hashes of at least a portion of the network addresses of the recipient computers for the plurality of messages;

storing the hashes in a database; and generating a first hash of at least a portion of the first network address, wherein determining that other messages have previously been sent to the first network address comprises comparing the first hash to the stored hashes in the database.

11. The method of claim 9, further comprising:

after determining that other messages have not previously been sent to the first network address, placing the first message in a default queue.

12. The method of claim 9, wherein the latency times of the other messages associated with the first network address form a statistical distribution, and wherein determining the latency value for response to the other messages associated with the first network address comprises:

calculating a statistical parameter of the statistical distribution, wherein the statistical parameter is one of a mean, a mode, or a median of the statistical distribution, the latency value being the statistical parameter.

13. The method of claim 9, further comprising:

after placing the first message in the second latency queue, generating an alert to the first recipient computer that the latency value for response is above the first threshold for the first network address.

14. The method of claim 9, further comprising:

dynamically changing the first threshold based on a first number of messages in the first latency queue and based on a second number of messages in the second latency queue.

15. The method of claim 9, wherein the messages are sent to the recipient computers using at least one of HTTP or TCP.

16. The method of claim 9, further comprising:

comparing the latency value to a second threshold; and determining whether to place the first message in the second latency queue or a third latency queue based on the comparing of the latency value to the second threshold.

* * * * *